United States Patent
Ogi

(10) Patent No.: US 7,259,494 B2
(45) Date of Patent: Aug. 21, 2007

(54) VEHICULAR ALTERNATOR WITH A PAIR OF DISSIMILIAR METAL ALLOY COLLECTOR RINGS

(75) Inventor: Hiroyuki Ogi, Komaki (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 11/073,747

(22) Filed: Mar. 8, 2005

(65) Prior Publication Data

US 2005/0200228 A1    Sep. 15, 2005

(30) Foreign Application Priority Data

Mar. 15, 2004   (JP)   ............... 2004-072463

(51) Int. Cl.
   *H02K 13/00*   (2006.01)
   *H02K 19/22*   (2006.01)
   *H01R 39/00*   (2006.01)

(52) U.S. Cl. ..................................... 310/232
(58) Field of Classification Search ......... 310/232–237
   See application file for complete search history.

(56) References Cited

U.S. PATENT DOCUMENTS 3,073,979 A * 1/1963 Potter ..................... 310/231
4,019,076 A * 4/1977 Bates ...................... 310/233
4,346,321 A * 8/1982 Frister .................... 310/232
4,406,961 A * 9/1983 Pfluger et al. ........... 310/232
4,535,264 A   8/1985 Allport
5,271,871 A * 12/1993 Yasutomi et al. ........ 252/520.2
5,459,364 A * 10/1995 Rondier ................... 310/232

FOREIGN PATENT DOCUMENTS

| JP | A 52-144705 | 12/1977 |
| JP | A 52-144706 | 12/1977 |
| JP | A 52-144707 | 12/1977 |
| JP | A 60-43041 | 3/1985 |
| JP | B2 1-40592 | 8/1989 |
| JP | 02269436 A * | 11/1990 |
| JP | A 9-149603 | 6/1997 |

* cited by examiner

*Primary Examiner*—Karl Tamai
(74) *Attorney, Agent, or Firm*—Oliff & Berridge, PLC

(57) ABSTRACT

A vehicular alternator includes a rotor, a stator and a brush device. The rotor includes a rotor coil wound around pole cores and a pair of collector rings electrically connected with the rotor coil. The stator is disposed around an outer periphery of the rotor across an air gap. The brush device contacts the pair of collector rings and feeds current to the rotor coil. The collector rings are made of dissimilar metal materials respectively. Thus, durability of the vehicular alternator can be improved while inhibiting increase in cost and decrease in output.

1 Claim, 2 Drawing Sheets

VEHICULAR ALTERNATOR WITH A PAIR OF DISSIMILIAR METAL ALLOY COLLECTOR RINGS

CROSS REFERENCE TO RELATED APPLICATION

This application is based on and incorporates herein by reference Japanese Patent Application No. 2004-72463 filed on Mar. 15, 2004.

BACKGROUND OF THE INVENTION

1. Field of the Invention

The present invention relates to a vehicular alternator mounted on a passenger car, a truck and the like.

2. Description of Related Art

A vehicular alternator receives motive energy from an engine and generates electricity. Thus, the alternator charges a battery and supplies the electric power to various electrical equipments such as an ignition device or lamps. In addition to reduction in size and weight or improvement in output, improvement in a lifetime of the product is also an important issue for maintaining and improving market competitiveness.

Generally, the vehicular alternator is often mounted in a lower space of an engine room because the vehicular alternator has relatively high mountability among accessories mounted to the engine. Moreover, size of the engine room is being reduced. Accordingly, removal of the vehicular alternator from the vehicle is becoming more and more laborious. Therefore, maintenance frequency of the vehicular alternator should be preferably reduced. Ideally, the vehicular alternator should be preferably made maintenance-free. To that end, lifetimes of brushes and collector rings need to be improved because the brushes and the collector rings are important factors determining the lifetime of the vehicular alternator. More specifically, abrasion resistance and environment resistance of the brushes and the collector rings need to be improved.

A technology disclosed in JP-A-S58-207841 (pages 4 and 5, FIGS. 1 to 6) (Patent Document 1) integrates an electrically conductive pipe member to a rotor shaft by a molding operation and the like and divides the integrated pipe member and the rotor shaft into a pair of collector rings. Thus, a general structure of the conventional collector rings can be obtained. The pair of collector rings providing a positive electrode and a negative electrode are made of the same material, since the single metal pipe is divided after the metal pipe is covered by a resin molding.

Copper is often used as the material of the collector ring. Stainless steel (SUS in the Japanese Industrial Standards) is also used as the material of the collector ring. In addition to electrical characteristics (voltage drop between the brush and a portion contacting the brush in a sliding manner) or mechanical characteristics (the abrasion resistance of the collector ring and the brush), economy (a material cost, a process cost) should be taken into account when the material of the collector ring is selected. Therefore, tendencies of correlations between the materials and the various characteristics are examined, for instance, in JP-A-H01-40592 (pages 3 and 4, FIGS. 1 to 5) (Patent Document 2). According to the examination in Patent Document 2, the copper has the better electrical characteristics than the stainless steel, and the cost of the copper is lower than the stainless steel. The stainless steel has the better mechanical characteristics than the copper. The copper or the stainless steel is selected and used in accordance with required characteristics.

Another structure of the collector ring is disclosed in JP-A-S52-144705 (pages 1 and 2, FIGS. 1 to 3) (Patent Document 3), JP-A-S52-144706 (pages 1 and 2, FIGS. 1 to 3) (Patent Document 4), and JP-A-S52-144707 (pages 1 and 2, FIGS. 1 to 3) (Patent Document 5). According to Patent Documents 3 to 5, an end of a rotor coil is extended and wound around a rotary shaft into a cylindrical shape. Thus, the end of the rotor coil is fixed to the rotary shaft. Then, a surface of the cylindrical shape is smoothed by a cutting work and the cylindrical shape is divided to form two metal rings. The metal rings are used as the collector rings.

Generally, the copper having the excellent electrical characteristics is used as the material of the collector ring having the structure disclosed in Patent Document 1. However, because of the mechanical characteristics of the copper, the surface of the collector ring tends to be abraded and tends to become rough due to heat generation accompanying the sliding contact between the collector ring and the brush made of metal graphite. Specifically, the abrasion and the roughness further tend to occur on the surface of the collector ring on a positive electrode side because of brush sparks. As a result, the abrasion of the collector rings and the brushes is promoted significantly, and durability is deteriorated.

As a measure to the above problems, the stainless steel can be used as the material of the collector rings, since the mechanical characteristics of the stainless steel are superior to those of the copper. However, the electrical characteristics of the stainless steel are inferior to those of the copper. More specifically, contact resistance between the brush and the collector ring is deteriorated and the voltage drop is increased if the collector ring is made of the stainless steel. Therefore, current fed to the rotor coil is reduced (current feeding is the main function of the collector ring), and the output of the vehicular alternator is deteriorated. Moreover, cost of the parts and product cost increase since the stainless steel is more expensive than the copper.

Since the collector ring having the structure disclosed in each one of Patent Documents 3 to 5 is formed by extending the end of the rotor coil, the collector ring is made of the same material as that of the rotor coil (generally, the copper). Therefore, negative effects caused in the case where the ring-shaped collector ring is made of the copper cannot be avoided. Moreover, softening refining of the copper wire material of the coil is performed in order to improve winding performance. Accordingly, there is a possibility that the abrasion of the collector ring is worsened. Therefore, it is not preferable to use the collector ring of Patent Documents 3 to 5 as the collector ring of the rotor of the vehicular alternator used under severe conditions.

SUMMARY OF THE INVENTION

It is therefore an object of the present invention to provide a vehicular alternator capable of improving durability while inhibiting increase in cost and decrease in output.

According to an aspect of the present invention, a vehicular alternator includes a rotor, a stator and a brush device. The rotor includes a rotor coil wound around an iron core and a pair of collector rings electrically connected with the rotor coil. The stator is disposed around an outer periphery of the rotor across an air gap. The brush device contacts the pair of collector rings and feeds current to the rotor coil. The collector rings are made of dissimilar metal materials respectively. The dissimilar metals having different characteristics are combined and used as materials of the pair of collector rings. Thus, excessive decrease of feeding current and increase in cost can be avoided. The excessive decrease of the feeding current and the increase in the cost can be caused in the case where both of the collector rings are made of stainless steel. Moreover, significant decrease of durability due to heat generation, abrasion or roughness accompanying sliding contact between the collector rings and the brushes can be inhibited. The significant decrease of the durability due to the heat generation, the abrasion or the roughness can be caused in the case where both of the collector rings are made of the copper. As a result, the durability can be improved while inhibiting the increase in the cost and the decrease in the output.

According to another aspect of the present invention, the stainless steel is used as the material of one of the pair of collector rings. Thus, mechanical characteristics can be improved compared to the case where both of the collector rings are made of the copper, which is often used as the material of the collector rings. As a result, the abrasion resistance can be improved, and the durability can be improved.

According to another aspect of the present invention, the vehicular alternator is formed so that a positive voltage is applied to the collector ring made of the stainless steel. Thus, the abrasion or the roughness of a surface of the collector ring caused by brush sparks specifically on the positive electrode side collector ring can be reduced.

According to yet another aspect of the present invention, a metal material having electrical conductivity superior to that of the stainless steel is used as the material of the other one of the pair of collector rings. Thus, deterioration of electrical characteristics can be inhibited while improving the mechanical characteristics. Thus, the durability can be improved and the output can be maintained at the same time.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

Figure 1:
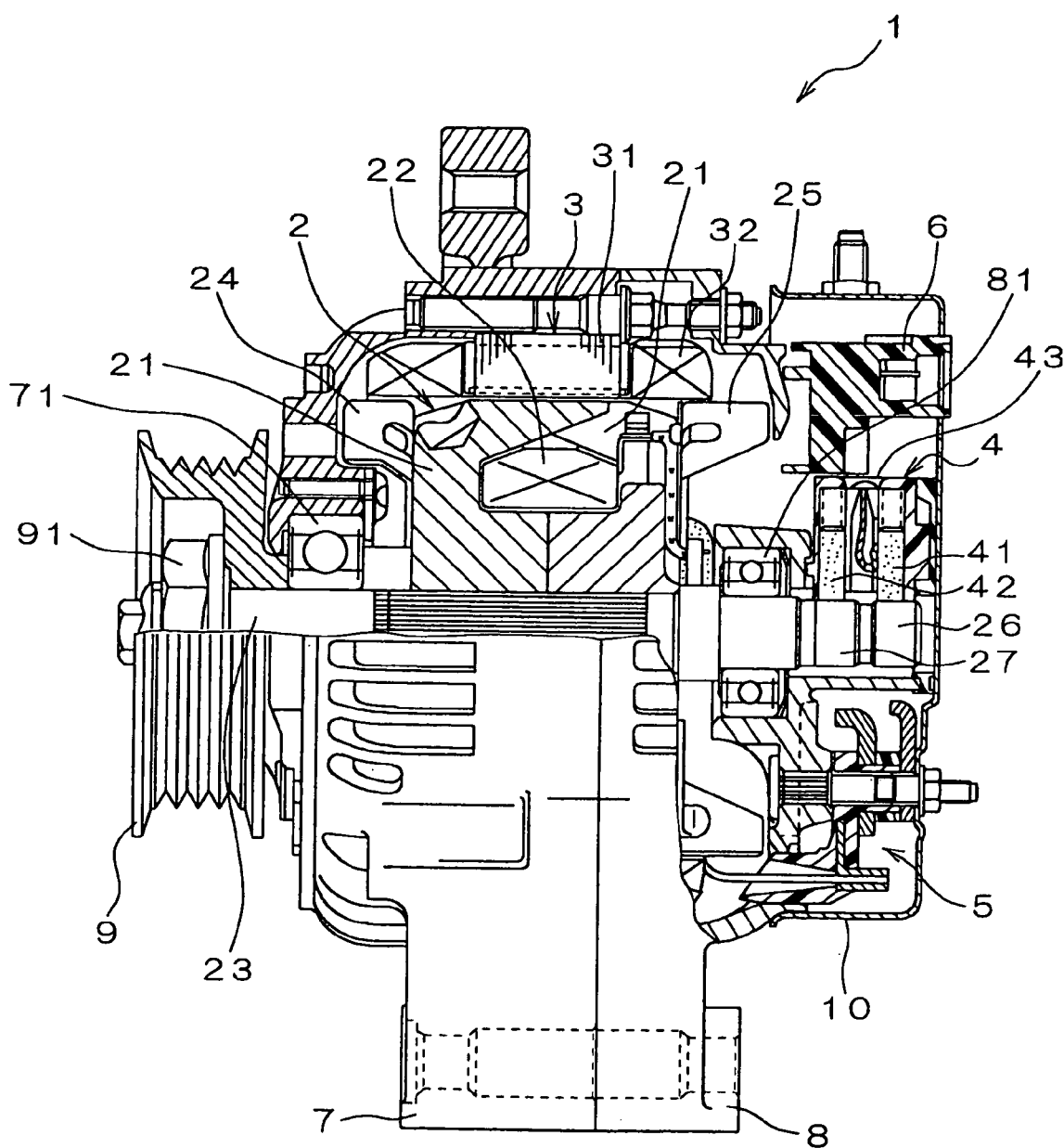
FIG. 1 is a partly sectional view showing a vehicular alternator according to an embodiment of the present invention.

Referring to FIG. 1, a vehicular alternator 1 according to an embodiment of the present invention is illustrated.

The vehicular alternator 1 shown in FIG. 1 includes a rotor 2, a stator 3, a brush device 4, a commutating device 5, an IC regulator 6, a drive frame 7, a rear frame 8, a pulley 9, a rear cover 10 and the like. The IC regulator 6 is a voltage regulation circuit for regulating energization of a rotor coil 22 through the brush device 4. The IC regulator 6 has a terminal for sensing a voltage of a positive electrode side terminal of the commutating device 5 or a voltage of a battery charged by the vehicular alternator 1 as an output voltage of the vehicular alternator 1. The IC regulator 6 can be structured as a circuit for performing duty cycle control of energization current of the rotor coil 22 so that the sensed voltage approaches to a predetermined target voltage.

The rotor 2 includes a pair of pole cores 21, the rotor coil 22, a rotary shaft 23, a cooling fan 24, and a cooling fan 25. The pole core 21 is an iron core having six claw portions. The rotor coil 22 is a field coil formed by coaxially winding an insulated copper wire into a cylindrical shape around the pole cores 21. The rotary shaft 23 is press-fitted into the pair of pole cores 21 in a state in which the rotor coil 22 is sandwiched between the pole cores 21. The cooling fan 24 is an axial fan fixed to an end surface of the pole core 21 on a front side by welding and the like. The cooling fan 24 suctions cooling air from the front side and discharges the cooling air in an axial direction and a radial direction. The cooling fan 25 is a centrifugal fan fixed to an end surface of the pole core 21 on a rear side by welding and the like. The cooling fan 25 suctions the cooling air from the rear side and discharges the cooling air in the radial direction. The rotary shaft 23 has a pair of collector rings (slip rings) 26, 27, which are electrically connected to both ends of the rotor coil 22 respectively.

The stator 3 is disposed around an outer peripheries of the pole cores 21 of the rotor 2 across a predetermined clearance. The stator 3 includes a stator core 31 and a three-phase stator coil 32 wound through multiple slots formed in the stator core 31 at predetermined intervals.

The brush device 4 feeds exciting current from the commutating device 5 to the rotor coil 22 of the rotor 2. The brush device 4 includes a pair of brushes 41, 42. The brushes 41, 42 are slidably pressed against the collector rings 26, 27 of the rotary shaft 23 respectively and feed the current to the rotor coil 22. The brush device 4 is structured by accommodating the pair of brushes 41, 42 in a box-shaped resin brush holder 43. Two spaces for holding the brushes 41, 42 are formed inside the brush holder 43 so that the spaces extend substantially radially with respect to the rotary shaft 23. A predetermined distance is provided between the brush holding spaces along the axial direction of the rotary shaft 23 so that the brush holding spaces respectively face outer peripheral surfaces of the corresponding collector rings 26, 27 in the radial direction. The brush holder 43 is fixed to the rear frame 8 by fixing means such as a bolt. Thus, the brush holder 43 is held so that the brush holder 43 protrudes outward from the rear frame 8. The brush 41 contacting the collector ring 26 in a sliding manner is held at a position farther than the brush 42 from the rear frame 8.

The commutating device 5 obtains a direct-current output voltage by commutating the three-phase-current voltage, which is the output voltage of the three-phase stator coil 32. The IC regulator 6 is operated by the output voltage of the commutating device 5. The IC regulator 6 performs interruption control of the exciting current fed to the rotor coil 22 through the pair of brushes 41, 42 and the pair of collector rings 26, 27 slidably contacting the brushes 41, 42. Thus, the IC regulator 6 regulates the output voltage of the vehicular alternator 1 to a predetermined regulation voltage.

The drive frame 7 and the rear frame 8 accommodate the rotor 2 and the stator 3 so that the rotor 2 can freely rotate centered on the rotary shaft 23. The pulley 9 is screwed and fixed to a tip end of the rotary shaft 23 (opposite from the collector rings 26, 27) with a nut 91. The pulley 9 is rotated by an engine. The rear cover 10 covers and protects the whole of the brush device 4 attached to the outer surface of the rear frame 8, the commutating device 5 and the IC regulator 6. The drive frame 7 is equipped with a ball bearing 71 as a bearing for rotatably holding the rotary shaft 23. The ball bearing 71 holds the rotor 2 at a position between the front side pole core 21 and the pulley 9. The rear frame 8 is equipped with a ball bearing 81 as a bearing for rotatably holding the rotary shaft 23. The ball bearing 81 holds the rotor 2 at a position between the rear side pole core 21 and the brush device 4, or the pair of collector rings 26, 27.

Figure 2:
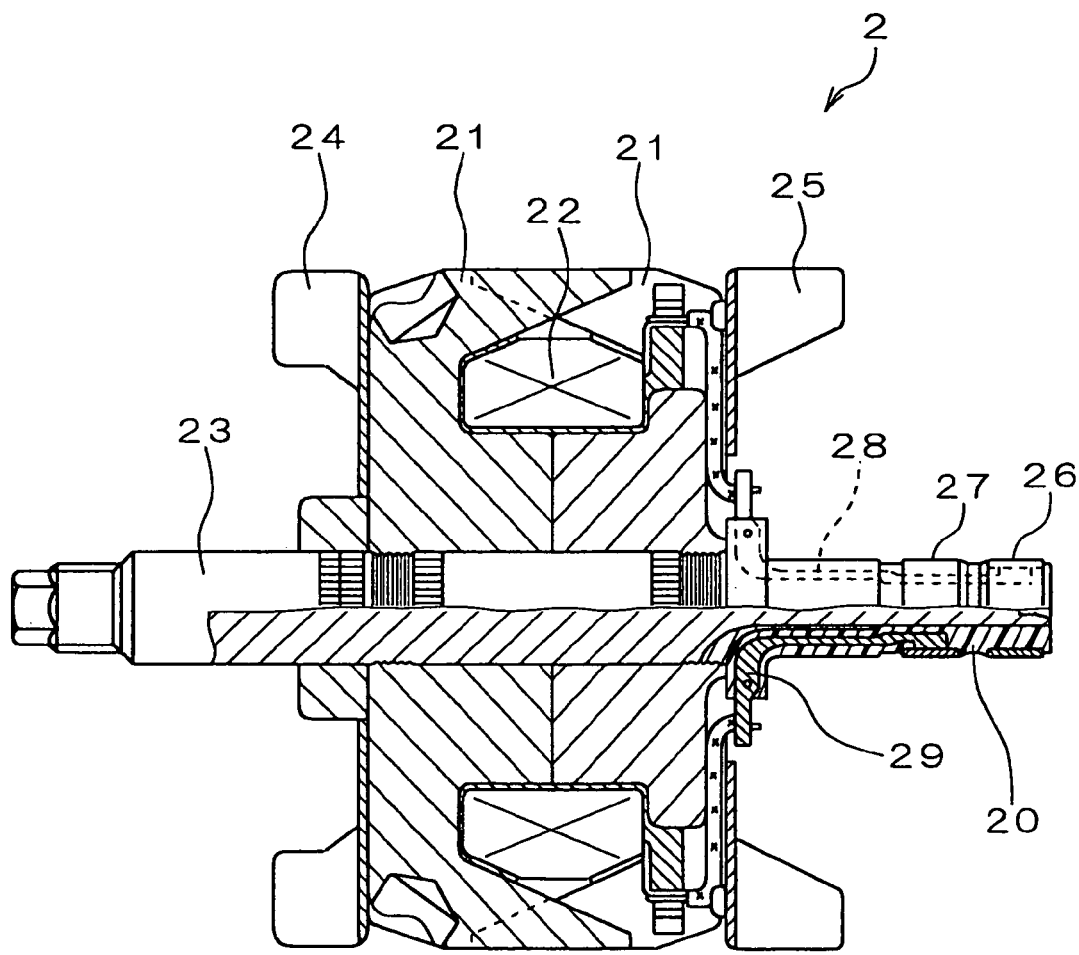
FIG. 2 is a sectional view showing a rotor of the vehicular alternator according to the embodiment.

The collector ring 26 on the rear side is made of stainless steel (SUS in the Japanese Industrial Standards). The collector ring 26 is electrically connected to one end of the rotor coil 22 through an electrical wire 28 welded to a part of an inner peripheral surface of the collector ring 26 as shown in FIG. 2. The brush 41 of the brush device 4 contacts the collector ring 26 in a sliding manner. Thus, a predetermined positive voltage is applied to the collector ring 26 by the IC regulator 6. The other collector ring 27 disposed on the pole core 21 side is made of copper. The collector ring 27 is electrically connected to the other end of the rotor coil 22 through an electrical wire 29 welded to a part of an inner peripheral surface of the collector ring 27. The other brush 42 of the brush device 4 contacts the collector ring 27 in a sliding manner. Thus, a predetermined negative voltage (a negative voltage corresponding to the positive voltage applied to the collector ring 26) is applied to the collector ring 27.

The collector rings 26, 27 are fixed to the rotary shaft 23 with a cylindrical holder 20. Electrical insulation and mechanical fixation of the electrical wires 28, 29 are achieved by the cylindrical holder 20 at the same time. The collector rings 26, 27 are arranged on an end portion of the holder 20 along an axial direction. A predetermined clearance is provided between the collector rings 26, 27 so that the collector rings 26, 27 are separated from each other along the axial direction. Thus, the collector rings 26, 27 are held and fixed so that the collector rings 26, 27 are electrically insulated from each other. The end portion of the cylindrical holder 20, where the holder 20 holds the collector rings 26, 27, is formed substantially in the shape of a cylinder, and the other end portion of the holder 20 is formed in the shape of a flange extending radially along the pole core 21. A middle portion of the holder 20 extending from a substantially central portion of the holder 20 slightly toward the pole core 21 side along the axial direction provides a holding portion contacting an inner ring of the ball bearing 81. The cylindrical holder 20 is made of an insulating material. For instance, the cylindrical holder 20 is manufactured by molding insulating resin. Respective ends of the electrical wires 28, 29 are exposed on the flange portion of the cylindrical holder 20 so that the ends of the electrical wires 28, 29 are separated from each other with respect to a circumferential direction. For instance, the ends of the electrical wires 28, 29 are arranged on a diameter of the flange portion of the cylindrical holder 20. The electrical wires 28, 29 are made of a metal having high electrical conductivity. The electrical wires 28, 29 extend through the flange portion and the holding portion and are connected to the corresponding collector rings 26, 27. A rear side end of the rotary shaft 23 is inserted into the cylindrical holder 20. Thus, the cylindrical holder 20 is fixed.

In the present embodiment, the collector rings 26, 27 are not interposed between the pair of ball bearings 71, 81 holding the rotor 2. The collector rings 26, 27 are held by the end portion of the rotary shaft 23 protruding from the ball bearing 81 toward the rear side. The rotary shaft 23 is held to the rear frame 8 not only by the ball bearing 81 but also by the resin cylindrical holder 20.

In the present embodiment, the collector ring 26 disposed at the position farther from the ball bearing 81 is made of the stainless steel as an iron alloy having abrasion resistance and corrosion resistance superior to the material of the collector ring 27. The collector ring 27 disposed at a position closer to the ball bearing 81 is made of the copper having the electrical conductivity superior to the material of the collector ring 26.

Thus, in the vehicular alternator 1 of the present embodiment, the dissimilar metals having the different characteristics are combined and used as the materials of the pair of collector rings 26, 27 mounted to the rotary shaft 23 of the rotor 2. Thus, excessive decrease in the feeding current or increase in cost can be avoided. The excessive decrease in the feeding current or the increase in the cost can be caused in the case where both of the collector rings 26, 27 are made of the stainless steel. Moreover, significant deterioration of durability due to heat generation, abrasion or roughness accompanying the sliding contact between the collector rings 26, 27 and the brushes 41, 42 can be avoided. The significant deterioration of the durability due to the heat generation, the abrasion or the roughness can be caused in the case where both of the collector rings 26, 27 are made of the copper. Thus, the durability can be improved while inhibiting the increase in the cost and the decrease in the output.

Specifically, the stainless steel is used as the material of the collector ring 26. Thus, the mechanical characteristics can be improved compared to the case where both of the collector rings 26, 27 are made of the copper, which is often used as the material of the collector ring. Thus, the abrasion resistance can be improved, and the durability can be improved. The positive voltage is applied to the collector ring 26 made of the stainless steel. Therefore, the abrasion or the roughness of the surface of the collector ring 26 due to the brush sparks can be reduced. The abrasion or the roughness of the surface due to the brush sparks tends to occur on the positive electrode side collector ring 26. The metal material (the copper, in the present embodiment) having the electrical conductivity superior to the stainless steel is used as the material of the other collector ring 27. Therefore, the deterioration of the electrical characteristics can be inhibited while improving the mechanical characteristics. Thus, the durability can be improved and the output can be maintained at the same time.

In the present embodiment, the collector ring 26 made of the stainless steel and the collector ring 27 made of the copper are combined and used. Various materials such as carbon for improving the electrical characteristics and the mechanical characteristics may be added to the materials of the collector rings 26, 27.

In the present embodiment, the copper having the excellent electrical conductivity and the stainless steel having the excellent mechanical characteristics are employed as the examples of the dissimilar metal materials of the pair of collector rings 26, 27. Thus, each one of the collector rings 26, 27 is made of the single metal material. Alternatively, either or both of the collector rings 26, 27 may be made of alloys, of which a main component is the copper, the stainless steel or other metals. In this case, for instance, the collector rings 26, 27 may be made of two kinds of alloys, which contain the same components including the copper as the main component, and only ratios of the components of the alloys may be differentiated. In the present embodiment, the two kinds of alloys containing the same components are treated as the dissimilar metals if the ratios of the components are differentiated between the two alloys.

In the case where the collector rings 26, 27 are made of the dissimilar metals, materials of the brushes 41, 42 may also be differentiated in accordance with the metals of the collector rings 26, 27 so that favorable electrical characteristics and mechanical characteristics are obtained.

The present invention should not be limited to the disclosed embodiment, but may be implemented in many other ways without departing from the spirit of the invention.

What is claimed is:

1. A vehicular alternator including a rotor, which has a rotor coil wound around an iron core and a pair of collector rings electrically connected with the rotor coil, a stator, which is disposed around an outer periphery of the rotor across an air gap, and a pair of brushes, each of which contacts a different one of the collector rings in a sliding manner and feeds current to the rotor coil, wherein one of the collector rings is made of a metal material dissimilar to a metal material of the other one of the collector rings, and the collector rings are made of two kinds of alloys composed of the same components including copper as a main component, the alloys being different in ratios of the components.

* * * * *